June 21, 1927.
A. S. HOLMES
1,632,897
THREAD CUTTING MACHINE
Filed Sept. 11, 1922    3 Sheets-Sheet 1
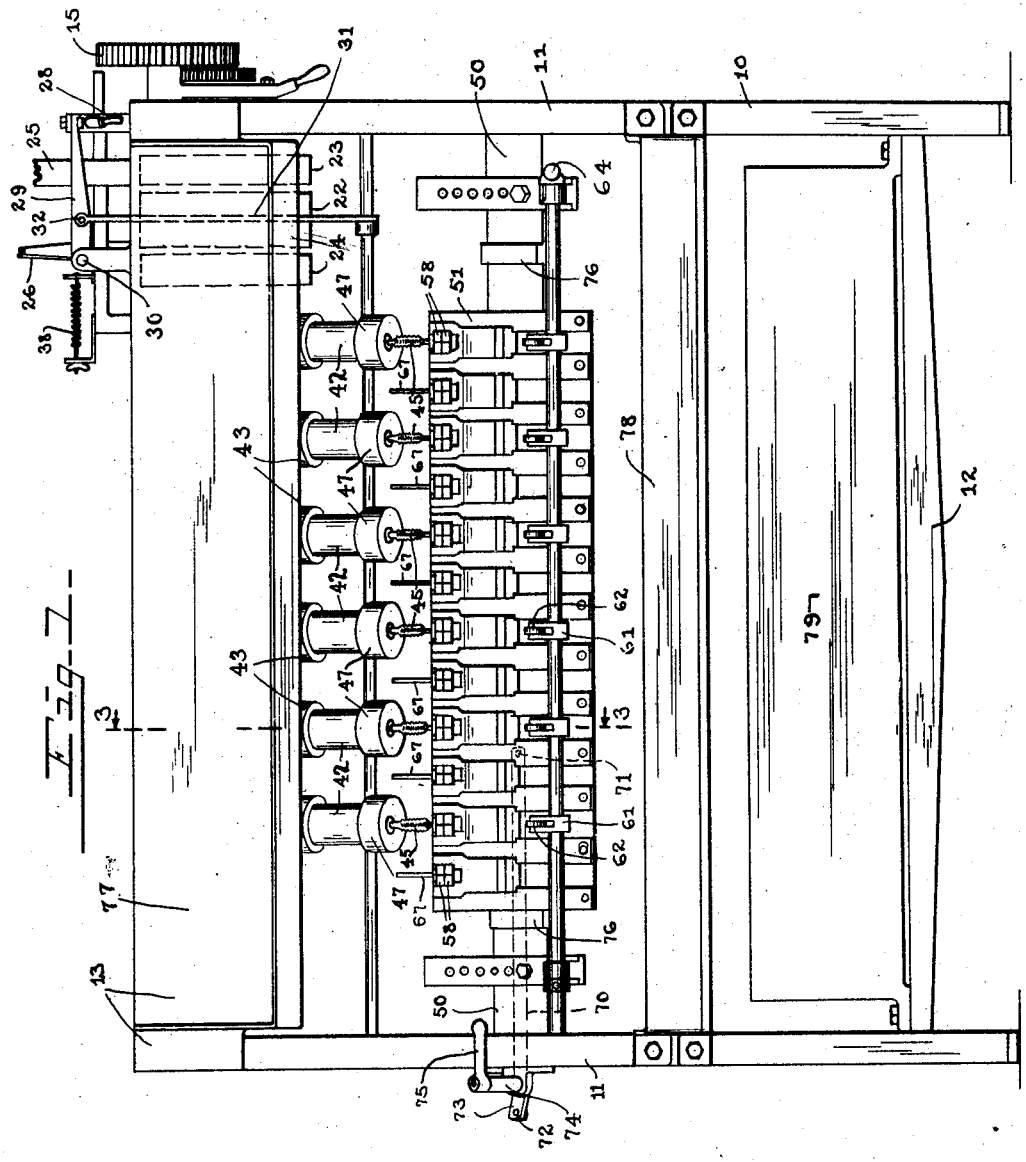
INVENTOR.
Arthur S. Holmes.
BY
Morsell + Keeney
ATTORNEYS.

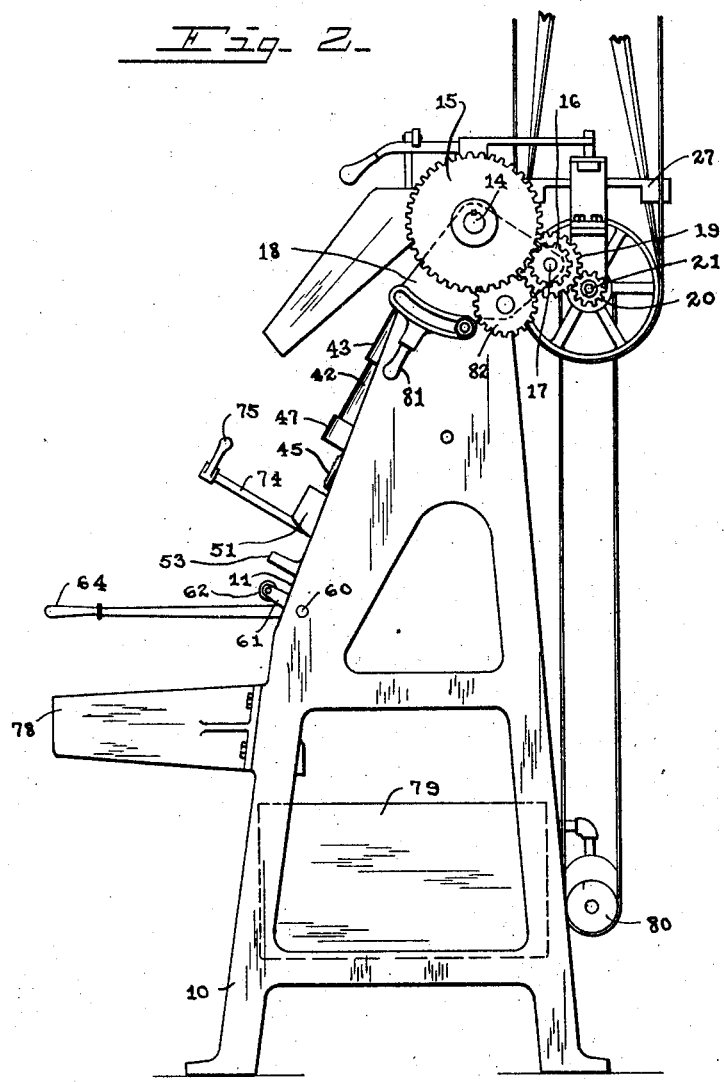

June 21, 1927.
A. S. HOLMES
1,632,897
THREAD CUTTING MACHINE
Filed Sept. 11, 1922    3 Sheets-Sheet 3
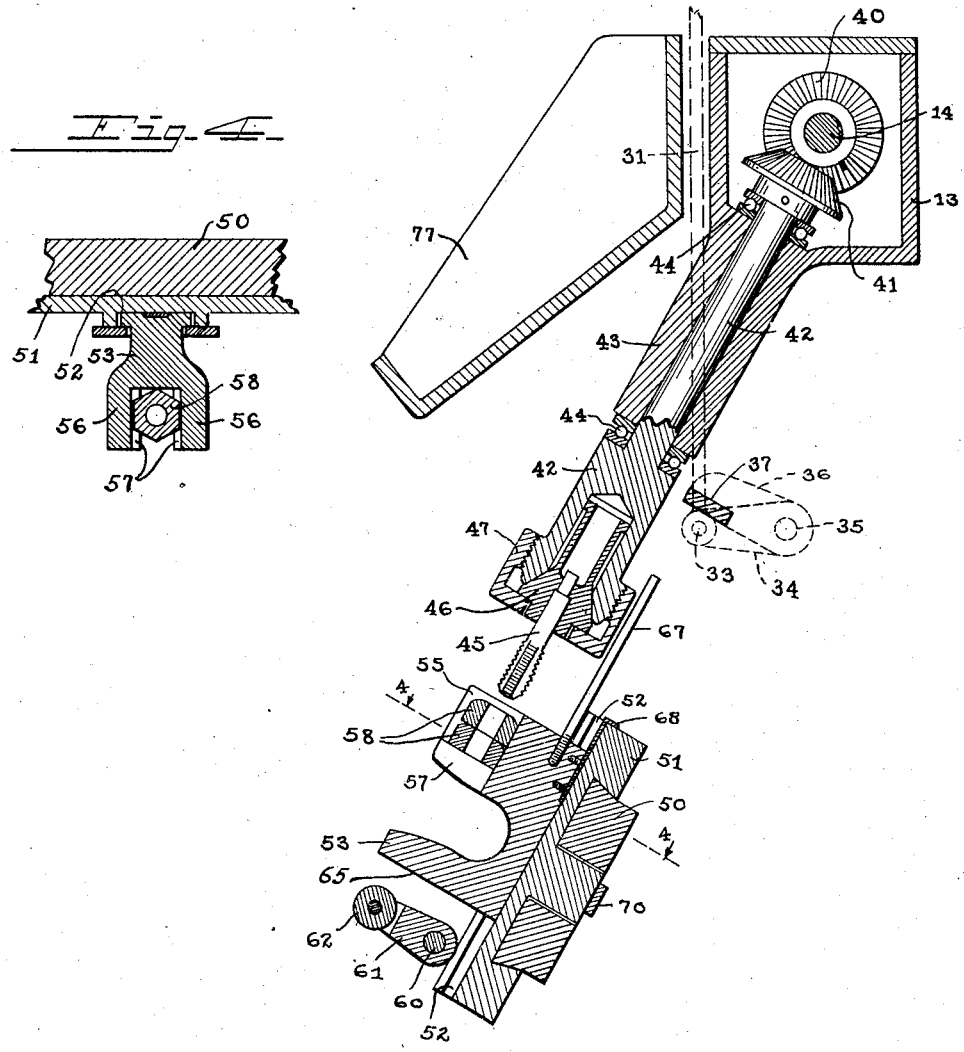
INVENTOR.
Arthur S. Holmes.
BY
Morsell & Keeney
ATTORNEY.

Patented June 21, 1927.

1,632,897

UNITED STATES PATENT OFFICE.

ARTHUR S. HOLMES, OF OSHKOSH, WISCONSIN.

THREAD-CUTTING MACHINE.

Application filed September 11, 1922. Serial No. 587,452.

This invention relates to thread cutting machines of the multiple spindle type and has for one of its objects to provide a machine of the class described in which a plurality of pieces of work may be simultaneously threaded while at the same time additional pieces may be made ready for being operated upon by the machine to the end that the threading operations may be carried on substantially continuously.

A further object of the invention is to provide a device of this character in which the work to be threaded is permitted to float relative to the threading tool, thereby obviating the necessity for the accurate alignment of the work and the tool.

Heretofore it has been the customary practice to clamp pieces which are to be threaded as nearly as possible in line with the threading tool. However, due to inaccuracies in drilling, it has been found impossible to align the work exactly with the tool without using a great deal more time than good shop practice will permit without reducing the efficiency of the shop.

It has, therefore, been the practice to merely align the work and the tools roughly and to then permit an uncertain amount of movement or float of the cutting tool, whereby the latter may accommodate itself more or less to any inaccuracy of alignment.

This method, however, has not been entirely satisfactory, inasmuch as the cutting tool, in a majority of cases, has been working off center, which resulted in the development of side strains between the work and the cutting tool, thereby causing a relatively large amount of tool breakage.

Tap manufacturers admit that approximately 90% of the taps are broken before they are worn out, due largely to the practice of floating the cutting tool, and this is true also on a smaller percentage with dies.

In order to overcome this objection the present invention contemplates the rigid mounting of the cutting tool and a provision of means for holding the work in such a manner as to permit lateral movement thereof to an extent sufficient to accommodate any inaccuracy of alignment between the work and the tool.

It has been found in actual practice that a marked decrease in tool breakage has resulted from the use of such a method, so much so that not over 10% of the taps are broken while in use. Furthermore the taps and dies give greatly increased service before getting dull.

In the accompanying drawings in which like numerals designate like parts in all the views;

Figure 1 is a front elevational view of a machine made in accordance with the present invention;

Fig. 2 is an end elevational view of the machine illustrated in Fig. 1, as seen from the right of the said figure;

Fig. 3 is a transverse, vertical, sectional view, taken approximately on the plane indicated by the line 3—3 of Fig. 1; and, Fig. 4 is a fragmentary detail sectional view, taken on the plane indicated by the line 4—4 of Fig. 3.

Referring to the drawings the numeral 10 designates a suitable framework comprising the upright end members or standards 11, suitably connected and spaced by means of the horizontal longitudinal members 12. Secured to the upper portion of the said standards 11 is a casing or housing 13 extending substantially the full width of the machine and through which passes the shaft 14, which is provided on one end with a gear 15 which meshes with a pinion 16, carried by a stub shaft 17 which is mounted on a swinging sector 18, pivoted upon the said shaft 14.

The said stub shaft 17 also carries a gear 19 which meshes with a pinion 20 carried by the counter-shaft 21, upon which is mounted a tight pulley 22 and a pair of loose pulleys 23 and 24. A pair of belts 25 and 26, the former of which is straight while the latter is crossed, engage the said pulleys and are adapted to be shifted thereon by means of a belt shifter 27, see Fig. 2.

The said belt shifter may be actuated by means of the hand lever 28, which lever is under the control of a latch 29 which is pivoted as at 30 to a portion of the framework and which is adapted to be actuated or controlled by means of a link or rod 31, pivotally connected at one end to the said lever or latch 29 as at 32, having its lower end pivoted as at 33, see Fig. 3, to an arm 34, carried by a reversing shaft or rod 35 which also carries a plurality of arms 36, which carry a reversing bar or plate 37, all as will appear more fully below. A spring 38 is connected to the belt shifter 27 and normally tends to pull the latter toward the left, as seen in Fig. 1, against the restraining action of the latch 29.

The shaft 14 carries within the housing 13, a plurality of bevel or mitre gears 40, which mesh with companion gears 41 rigid with the spindles 42 which are rotatably mounted in the inclined bearing extensions 43 of the housing 13 and provided with suitable anti-friction bearings 44, as will be clear from Fig. 3. The said spindles 42 carry at their lower ends, suitable chucks for receiving and holding the threading tools, and comprising the threaded resilient collets 46 controlled by caps 47 threaded to the end of the spindles in the well known manner.

Extending longitudinally of the machine and secured to the standards 11 is a horizontal supporting member or slide 50, see Figs. 1 and 3, upon which is slidably mounted any jig carriage 51. This said jig carriage is provided with a plurality of guide-ways 52 extending transversely thereof, so that they run in inclined directions vertically when in place upon the machine.

These said guide-ways 52 are adapted to receive the jigs or work-holding members 53 in such a manner as to permit of the vertical sliding movement of the same as well as a slight lateral movement to aline with the tools, as will be readily apparent. The said jigs or holding members 53, as is best shown in Figs. 3 and 4, are provided with work-receiving slots 55, located between a pair of arms 56, the lower portions of which are provided with the ears 57 upon which the nuts, or other work 58 to be threaded, may rest.

The parts are so designed and constructed that when the jigs are in their operative position, as illustrated in Fig. 3, the work 58, in the present case nuts in pairs, will be roughly positioned in alignment with the cutting tools 45, as will be readily apparent.

In order to move the jigs and their work toward the cutting tools 45, there is provided a rock shaft 60, which carries a plurality of arms 61 having roller members 62 at their free ends, as best shown in Figs. 1 and 3. The said rock shaft 60 also carries at one end a handle 64 by means of which it may be oscillated to bring the roller 62 into engagement with the lower surfaces 65 of the jig members 53 thus producing a cam action which forces the said jigs upwardly in their guide-ways 52 until the nuts or other members 58 are brought into engagement with the lowermost end of the cutting tools 45.

Inasmuch as the said nuts 58 are loosely resting within the slots or recesses 55 of the jig members but are being held against rotation by the engagement of their sides with the side walls of the said slots and the jig members are movable laterally and upwardly, the nuts are free to move to align themselves with the said cutting tool. In other words, the nuts or other work, are permitted to float in the jig members 53 and the jig members are permitted to float laterally and towards the tools to the end that the nuts will automatically assume positions in alignment with the cutting tools when brought into engagement with the lower ends thereof.

The said jigs 53 are provided with the upwardly extending pins 67 which act as reversing trips, as will presently appear, and the said jigs are also provided with the L-shaped members 68 which engage the jig carriage 51 to act as stops to limit the downward movement of the said jigs, 53.

In order to alternately position the jigs in operative relation beneath the threading tools, there is provided a lever or link 70 pivotally connected as at 71 to the jig carriage 51 and its other end is pivoted as at 72 to a crank arm 73 carried by a shaft 74, provided with the handle 75, thereby providing means for shifting the jig carriage 51 longitudinally upon the supporting slide member 50 to bring alternate jigs and their supported work out of alignment with the threading tools to permit removal and insertion of nuts 58. Suitable stops 76 are provided upon the supporting bar 50 for limiting the longitudinal movement of the said jig carriage.

A work receiving pan or tray 77 is preferably supported above the spindles 42 and an oil receiving pan 78, as well as an oil reservoir 79 are provided beneath the said spindles for the purpose of catching the lubricating oil which is usually employed in cutting operations of this character. A pump 80 may be in communication with the said reservoir 79 and may feed the said oil to the threading tools through any suitable piping or connections, not shown.

The operation of the improved machine will be clear from the foregoing but it may be briefly summarized as follows. It being desired to thread a plurality of nuts, to carry on the operation continuously, the shaft 74 is moved by means of its handle 75 through the crank 73 and link 70, and the jig carriage 51 will be moved toward the right, as seen in Fig. 1. This permits the jigs 53 to be moved upwardly in their guide-ways 52, whereupon the uppermost nuts 58 will be brought into engagement with the lower ends of the taps 45. The latter is being rotated by means of its spindles 42 through the gears 40 and 41 from the shaft 14 and when the said lower ends of the taps engage the holes within the nuts, the latter and the jigs will automatically move to align properly with the rotating taps.

Pressure being maintained upon the jigs 53 by means of the handle 64, the said jigs will be forced further upwardly, thereby feeding the nuts 58 upwardly and causing the tap 45 to cut the threads within the holes of the said nuts in the well known manner.

When the threading operation has been completed the jigs 53 have risen to such a point that the pins 67 engage the reversing bar 37 and move it, together with the arms 36 and locking shaft 35, a slight distance, which movement is transmitted through the arm 34 and link 31 to the latch member 29, thereby lifting the same out of engagement with the controlling handle 28 and permitting the spring 38 to move the belt shifter 27 toward the left, as seen in Fig. 1, thereby shifting the belts 25 and 26 in such a manner as to reverse the direction of rotation of the main shaft 14.

This will likewise reverse the motion of the taps 45 and will cause them to be withdrawn from the threaded nuts, the handle 64 in the meantime, being released so that the jigs 53 may be moved downwardly until stopped by the engagement of the members 68 with the jig carriage 51.

The handle 75 is then manipulated, and through the crank arm 73 the link 70 moves the entire jig carriage to the right, as seen in Fig. 1, thereby bringing the second set of jigs into approximate alignment with the threading tools, whereupon the operation above described may be repeated. During this threading operation the jigs containing the work which has already been finished, may be emptied and new unthreaded work may be placed therein, ready to be operated on upon completion of the second cycle.

The machine may be used for producing either right or left hand threads by merely shifting the sector 18 by means of its handle 81 to disengage the gear 19 from the pinion 20 and to engage the idler gear 82 therewith, thereby reversing the direction of the rotation of the shaft 14 without reversing the direction of the power shaft 21.

It will be understood that to start the machine in operation the belts 25 and 26 are shifted to the positions illustrated in Fig. 1 by means of the handle 28, which moves the belt shifter 27 toward the right, as seen in the said figure against the tension of the spring 38, until the latch 29 engages the same. Upon tripping of the latch, as above described, the said spring 38 will move the belt shifter 27 toward the left, thus shifting the belt 25 from the loose pulley 23 to the tight pulley 22 and shifting the belt 26 from the tight pulley 22 to the loose pulley 24.

It will thus be seen that this invention provides a machine for the simultaneous threading of more than one piece of material with a single spindle; that the machine requires but an approximate alignment of the hole to be tapped or of the piece to be threaded, with the die, inasmuch as the work and the jigs are floatingly held while the threading tool is rigid, thereby reducing to a minimum the breakage of the tools, due to side strains developed when the latter are permitted to float and the work held rigid.

It will further be seen that the machine is substantially automatic in its action, except for placing the work in the jigs, thus materially reducing the amount of time and labor required.

It is obvious that those skilled in the art may vary the details of construction, as well as the arrangement of parts without departing from the spirit of the invention, and therefore it is not wished to be limited to the above disclosure except as may be required by the claims.

What is claimed is:

1. In a machine of the class described, a frame; a power shaft rotatably mounted in said frame; a plurality of rotatable spindles driven by said shaft, each of said spindles being provided with means for rigidly holding a threading tool; tools carried by said holding means; a plurality of sets of work holding jigs slidably mounted for transverse and axial movement relative to said tools; means for reversing the motion of said shaft; means carried by said jigs for actuating said reversing means; manual means for moving said jigs transversely of said tools; and independent manual means for moving said jigs axially of said tools.

2. In a machine of the class described, a frame; a power shaft rotatably mounted in said frame; a plurality of rotatable spindles driven by said shaft, each of said spindles being provided with means for rigidly holding a threading tool; tools carried by said holding means; a transverse slide bar rigid with said frame; a jig carried slidably mounted on said bar; a plurality of sets of jigs slidably mounted on said carriage for movement axially of said tools; means for moving said carriage transversely of said tools to bring different sets of jigs into approximate alignment therewith; and means for moving said sets of jigs axially of said tools.

3. In a machine of the class described, a frame; a power shaft rotatably mounted in said frame; a plurality of rotatable spindles driven by said shaft, each of said spindles being provided with means for rigidly holding a threading tool; tools carried by said holding means; a transverse slide bar rigid with said frame; a jig carriage slidably mounted on said bar; a plurality of sets of jigs slidably mounted on said carriage for movement axially of said tools; means for moving said carriage transversely of said tools to bring different sets of jigs into approximate alignment therewith; means for moving said sets of jigs axially of said tools, means for reversing the motion of said shaft; and means carried by said jigs for actuating said reversing means.

4. In a machine of the class described, a frame; a power shaft rotatably mounted in said frame; a plurality of rotatable spindles driven by said shaft, each of said spindles being provided with means for rigidly holding a threading tool; tools carried by said holding means; a transverse slide bar rigid with said frame; a jig carriage slidably mounted on said bar; a plurality of sets of jigs loosely and slidably mounted on said carriage for movement axially of said tools, said jigs being adapted to non-rigidly support a piece of work; manual means for moving said carriage transversely of said tools to bring different sets of jigs into approximate alignment therewith and to permit the work to aline with the tools; manual means for moving said sets of jigs axially of said tools; means for reversing the motion of said shaft; and means carried by said jigs for actuating said reversing means.

5. A threading machine, comprising a rotary threading tool, means for holding said tool against lateral movement, and means laterally and axially movable for non-rigidly supporting one or more nuts to be threaded by said tool, said means permitting of free lateral movement of said nuts relative thereto in a plane substantially at right angles to the planes of movement of said means.

In testimony whereof, I affix my signature.

ARTHUR S. HOLMES.